(12) United States Patent
Kikuchi et al.

(10) Patent No.: US 6,654,557 B2
(45) Date of Patent: Nov. 25, 2003

(54) LENS DRIVING APPARATUS HAVING TAPERED POSITIONING DOWEL

(75) Inventors: Yoshihiro Kikuchi, Kagawa (JP); Yukihiro Takabatake, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/959,388

(22) PCT Filed: Feb. 26, 2001

(86) PCT No.: PCT/JP01/01409

§ 371 (c)(1),
(2), (4) Date: Mar. 5, 2002

(87) PCT Pub. No.: WO01/63333

PCT Pub. Date: Aug. 30, 2001

(65) Prior Publication Data

US 2002/0106205 A1 Aug. 8, 2002

(30) Foreign Application Priority Data

Feb. 25, 2000 (JP) .......................................... 2000-49713

(51) Int. Cl.[7] .............................. G02B 7/04; G03B 13/00
(52) U.S. Cl. ........................................ 396/144; 359/823
(58) Field of Search ................... 396/72, 144; 359/694, 359/822, 823, 829

(56) References Cited

U.S. PATENT DOCUMENTS 5,150,260 A * 9/1992 Chigira ....................... 359/694

FOREIGN PATENT DOCUMENTS

| JP | 4-46307 | 2/1992 |
|----|---------|--------|
| JP | 6-308361 | 11/1994 |
| JP | 7-43779 | 2/1995 |
| JP | 7-72364 | 3/1995 |
| JP | 7-325242 | 12/1995 |
| JP | 8-248284 | 9/1996 |
| JP | 9-325257 | 12/1997 |
| JP | 11-264925 | 9/1999 |

* cited by examiner

Primary Examiner—Russell Adams
Assistant Examiner—Arthur A. Smith
(74) Attorney, Agent, or Firm—Wenderoth, Lind & Ponack, L.L.P.

(57) ABSTRACT

A lens driving apparatus comprises a positioning dowel which rotatably supports a shaft of a driving member so as not to have a backlash. The positioning dowel is formed on a lens holding frame. A rack part and a coil spring mounting dowel are formed on the driving member. A coil spring is mounted on the coil spring mounting dowel of the driving member, and the rack part of the driving member is pressed against a feed screw of a motor by using the positioning dowel of the lens holding frame as a rotation fulcrum. The lens driving apparatus has an elastic rotating force in a direction along which the lens holding frame is made to abut a second guide pole, and a moment in a direction along which the lens holding frame is pressed against the second guide pole by self-weight of the lens holding frame, including the lens, is added to the elastic rotating force.

18 Claims, 11 Drawing Sheets

LENS DRIVING APPARATUS HAVING TAPERED POSITIONING DOWEL

TECHNICAL FIELD

The present invention relates to a lens driving apparatus which performs focus adjustment (hereinafter abbreviated as focusing) by performing lens position adjustment of a master lens when a subject is photographed using a video camera or the like and, more particularly, to a lens driving apparatus which can prevent defocusing during a zooming operation resulting from manual focusing, or defocusing of a photographed image which would otherwise result from a difference between positions during photographing.

BACKGROUND ART

Conventionally, a focusing operation of a lens driving apparatus included a video camera or the like, which is disclosed in Japanese Published No. Hei.6-308361, has been known, and this will be described with reference to figures hereinafter. FIG. 8 is a perspective view illustrating a main portion of a conventional lens driving apparatus. FIG. 9 is an expanded cross sectional view illustrating a relationship between a feed screw and a first arm of a driving member in the lens driving apparatus shown in FIG. 8. FIG. 10 is an expanded cross sectional view illustrating a relationship between the feed screw and a second arm of the driving member in the lens driving apparatus shown in FIG. 8. FIG. 11 is an expanded cross sectional view illustrating a combination relationship between the driving member and a lens holding frame in the lens driving apparatus shown in FIG. 8. FIG. 12 is an expanded cross sectional view illustrating a combination and protective relationship between the driving member and the lens holding frame in the lens driving apparatus shown in FIG. 8. FIG. 13 is a cross sectional view of a main section illustrating the conventional lens driving apparatus when the apparatus is faced in a horizontal direction to perform photographing. And, FIG. 14 is a cross sectional view of a main section illustrating the conventional lens driving apparatus during tilt-photographing.

A structure of the conventional lens driving apparatus will be described hereinafter. In FIG. 8, a lens 1, which performs focusing of a subject is fixed to a lens holding frame 2, made of a resin, by performing an operation such as heat-staking. The lens holding frame 2 is held by a first guide pole 3 and a second guide pole 4, which are arranged in a fixed body tube (not shown) so as to be slidable in the direction of a lens optical axis 5. Further, there is provided a groove 2a on an upper part of the lens holding frame 2, which groove connects a driving member 9 to the lens holding frame 2. There is further provided a feed screw 7a in a driving shaft 7 of a motor 6, which motor is attached to the fixed body tube. The driving member 9 made of a resin is slidably held by a third guide pole 10 arranged at a motor mounting body 8 and extending parallel to the driving shaft 7. Furthermore, the driving member 9 is provided with a notch nut 9a which is threadedly engaged with the feed screw 7a as shown in FIG. 9, and is also provided with a first arm 9b having spring characteristics for supporting the feed screw 7a by sandwiching the feed screw.

On the other hand, a second arm 9d is formed on the driving member 9 as shown in FIG. 10, and a gap between the second arm 9d and a thread part of the feed screw 7a is constructed so as to have a smaller gap size than a screw-thread height size of the notch nut 9a. Further, as shown in FIG. 11, at a portion of the driving member 9 that is connected with the lens holding frame 2 there is provided an edge portion 9c having enough rigidity to slidably move the lens holding frame 2, and also having spring characteristics. This edge portion 9c is inserted into the groove 2a in the direction of the arrow, thereby constructing a backlash-free connection in the direction of the lens optical axis 5. Further, as shown in FIG. 12 at the portion of the driving member that is connected with the lens holding frame 2 there is provided a stopper edge portion 9e which does not abut the groove 2a, so that the edge portion 9c having the spring characteristics is not curved to a spring limit due to shock.

In the conventional lens driving apparatus so constructed, an operation thereof will be described hereinafter. The feed screw 7a formed in the driving shaft 7 is inserted into the notch nut 9a of the driving member 9 so as to be pressured and energized by the first arm 9b having the spring characteristics. In this case, since the driving member 9 is slid by the third guide pole 10 to move in the direction of the lens optical axis 5 when the motor 6 rotates, the lens holding frame 2 connected to the driving member 9 is also slid by the first guide pole 3 and the second guide pole 4 in accordance with rotation of the motor 6 to move in the direction of the lens optical axis 5, thereby to obtain focusing of the lens 1.

However, in this construction, the driving member 9 supports the feed screw 7a by sandwiching it through the notch nut 9a and the first arm 9b. Therefore, when the feed screw 7a vibrates during rotation of the motor 6, this vibration is directly transmitted to the driving member 9, thereby causing the driving member to vibrate around the third guide pole 10. Since the driving member 9 and the lens holding frame 2 are connected to each other in the direction of the lens optical axis 5 by the edge portion 9c, having spring characteristics, without backlash, vibration is transmitted to the lens holding frame 2 without being completely absorbed in the edge portion 9c, and therefore, the lens vibrates, whereby, when focusing is performed, an image shakes so that a photographed video becomes hard to view.

Further, even when a tilt-photography is performed by a video camera which is provided with this lens driving apparatus, there is a problem as follows. Specifically, when a focusing operation is performed while photographing is performed in a state where the video camera is horizontal, the lens holding frame 2, which holds the lens 1, is slid by the first guide pole 3 and the second guide pole 4. Also, the driving member 9 is slid by the third guide pole 10, and the lens holding frame 2 and the driving member 9, having respective clearances d, horizontally move in the direction of the lens optical axis 5 to perform focusing as shown in FIG. 13.

When photographing is performed in a slightly tilted state from this state, as shown in FIG. 14, the edge portion 9c having the spring characteristics cannot absorb a slope of the lens holding frame 2, and therefore, the lens holding frame 2 tilts in a self-weight direction of the lens 1 shown by an arrow W3, by a smaller of a clearance D2 maintained between the first guide pole 3 and the lens holding frame 2 and a clearance D3 maintained between the third guide pole 10 and the driving member 9, thereby accordingly generating a tilt of the lens 1 and then a single blur phenomenon of a photographed video.

The present invention is made to solve these problems, and has for its object to provide a lens driving apparatus which faithfully transmits a feed displacement of a motor as feed displacement of a lens, has a stable driving performance, and wherein a photographed video does not vibrate due to a vibration of the motor.

SUMMARY OF THE INVENTION

In accordance with a first aspect of the invention, provided is a lens driving apparatus having a lens holding frame which holds a lens and is guided by a first guide pole and a second guide pole to slidably move in a lens optical axis direction. The apparatus further has a driving shaft having a feed screw which is rotated and driven by a motor, and a driving member which has a rack threadedly engaged with the feed screw of the driving shaft at one end and is engaged with the lens holding frame at another end. The driving member is rotatably mounted to a positioning dowel which is provided on the lens holding frame and extends in the lens optical axis direction via a positioning hole provided in the driving member. Also, a spring member, which presses the rack of the driving member against the driving shaft, as well as provides an elastic rotating force in a direction along which the lens holding frame is pressed against the second guide pole, is provided between the lens holding frame and the driving member. A moment in a direction along which the lens holding frame is pressed against the second guide pole by a self-weight of the lens holding frame is added to the elastic rotating force of the spring member. Accordingly, avoided can be a photographed video that vibrates due to a random vibration produced by rotation of the motor. Also, a feed displacement of the motor can be faithfully transmitted as feed displacement of the lens.

In accordance with a second aspect of the invention, in the lens driving apparatus of the first aspect, the driving member is made of a resin material and includes two integral leg parts that are capable of elastic deformation and parallel to each other. The leg parts are respectively provided with positioning holes at their tips. The positioning dowel formed in the lens holding frame has a taper shape such that a diameter of the dowel becomes smaller toward a tip thereof, and a diameter of a bottom part of the positioning dowel is constructed so as to be larger than a diameter of the positioning hole. Accordingly, feed displacement of the motor during photographing can be faithfully transmitted as feed displacement of the lens, and a continually stable driving performance of the lens can be guaranteed.

In accordance with a third aspect of the invention, in the lens driving apparatus of the second aspect, also provided is a stopper which restricts deformation and removal of the driving member, and is formed integrally with the driving member and the lens holding frame. Thereby, when an external force acts on the lens holding frame due to a fall, shock, or the like, the driving member can be prevented from being separated from the lens holding frame.

DESCRIPTION OF THE PREFERRED EMBODIMENT

Hereinafter, an embodiment of the present invention will be described with reference to figures. Further, the same numerals are given to the same parts as the above-described conventional example, and the detailed description thereof will be omitted.

Figure 1:
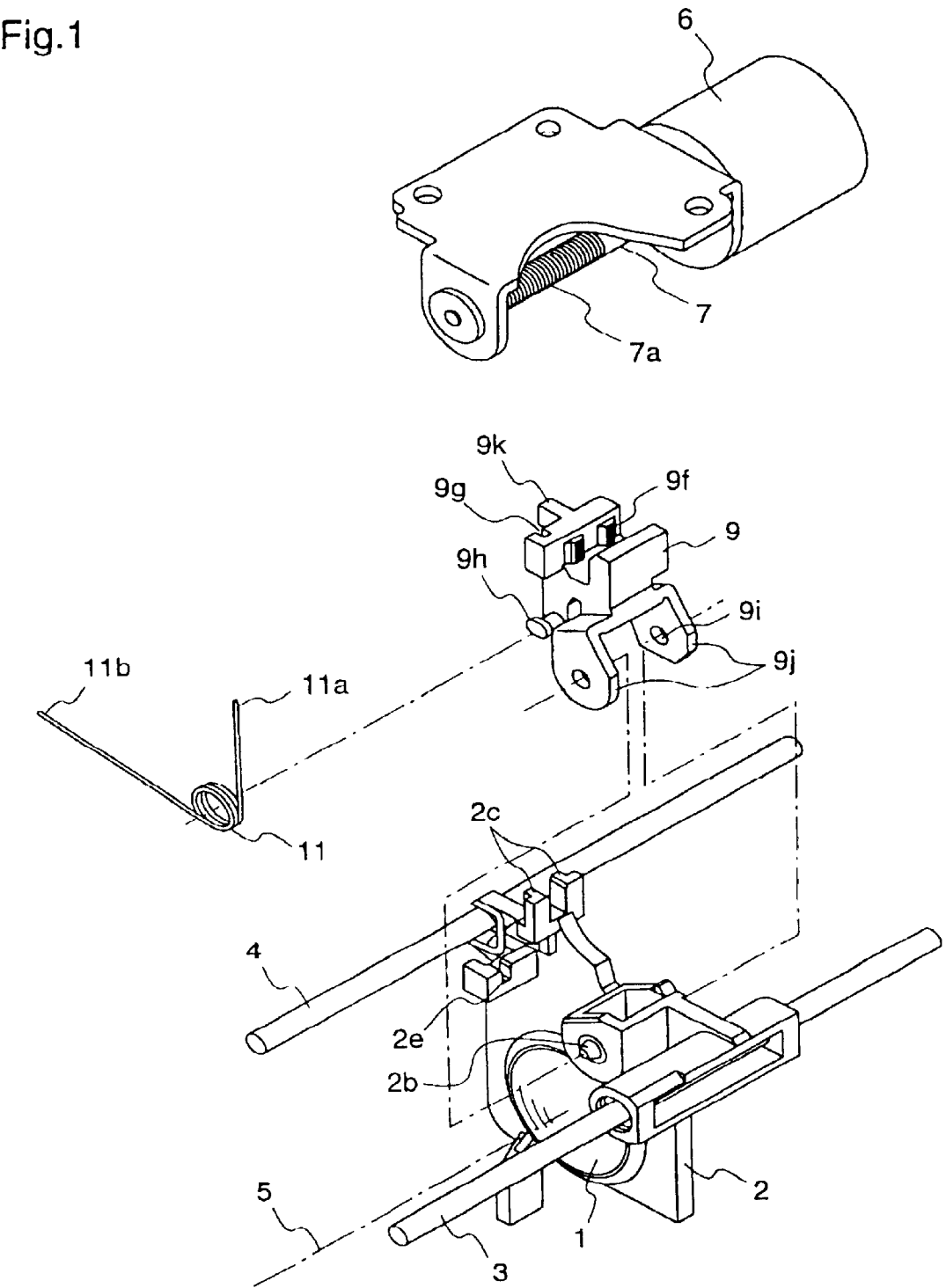
FIG. 1 is an exploded perspective view of a main portion according to an embodiment of a lens driving apparatus of the present invention.
Figure 2:
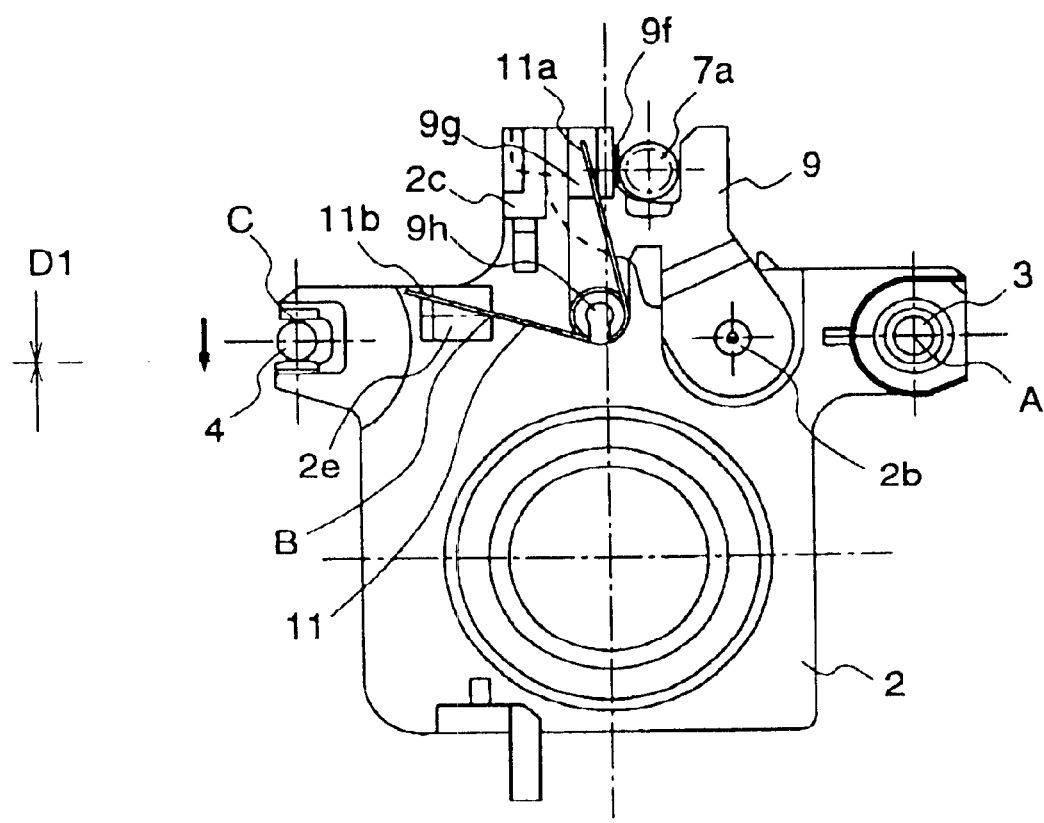
FIG. 2 is a side view illustrating a state where a driving member and a coil spring are attached to a lens holding frame of the lens driving apparatus shown in FIG. 1
Figure 3:
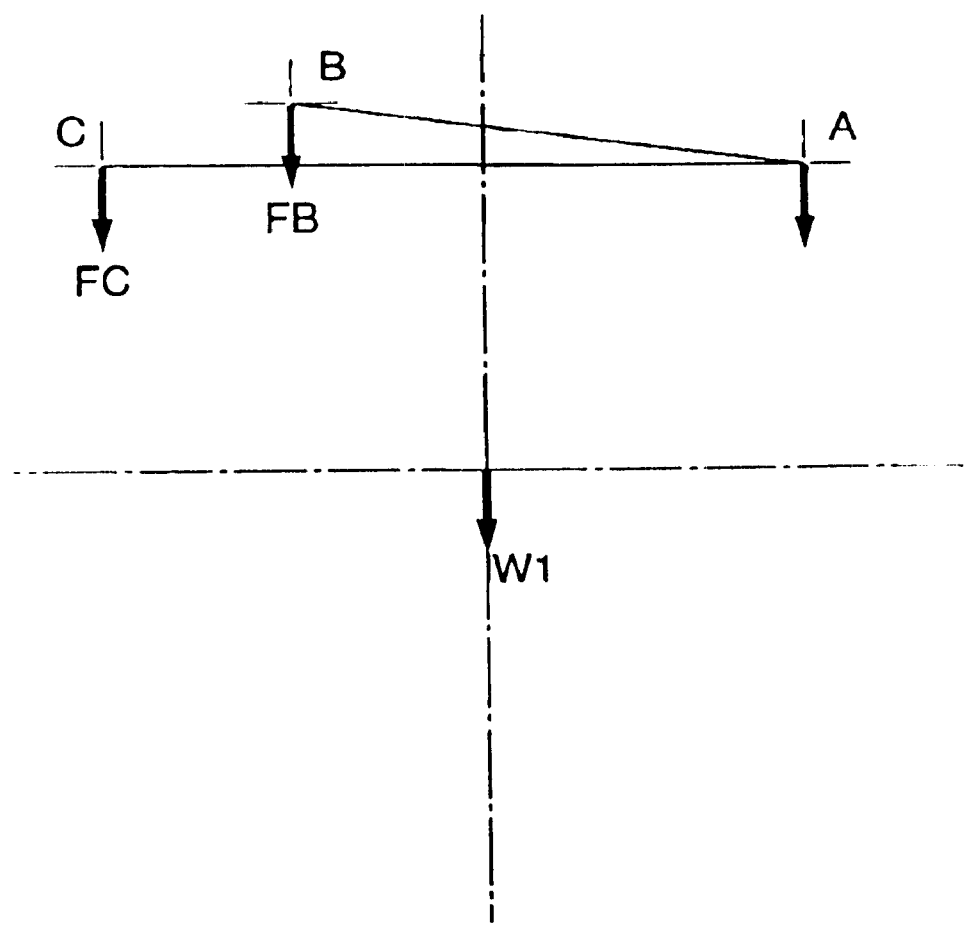
FIG. 3 is a vector diagram illustrating directions of forces to act between a position where the lens holding frame and the coil spring are abutted, and a position where the lens holding frame and a second guide pole are abutted, in the lens driving apparatus shown in FIG. 1.
Figure 4:
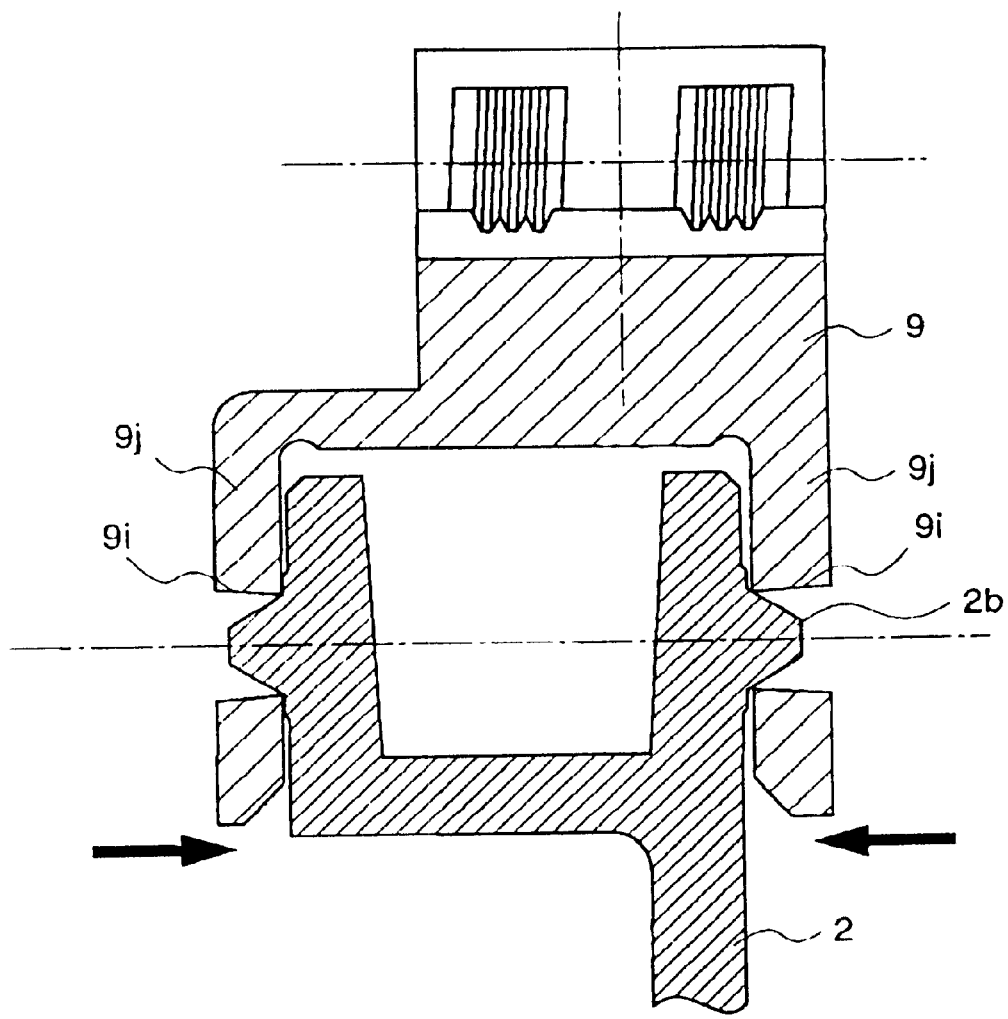
FIG. 4 is a cross sectional view of a main section illustrating a state where a leg part of the driving member is attached to a positioning dowel of the lens holding frame in the lens driving apparatus shown in FIG. 1.
Figure 5:
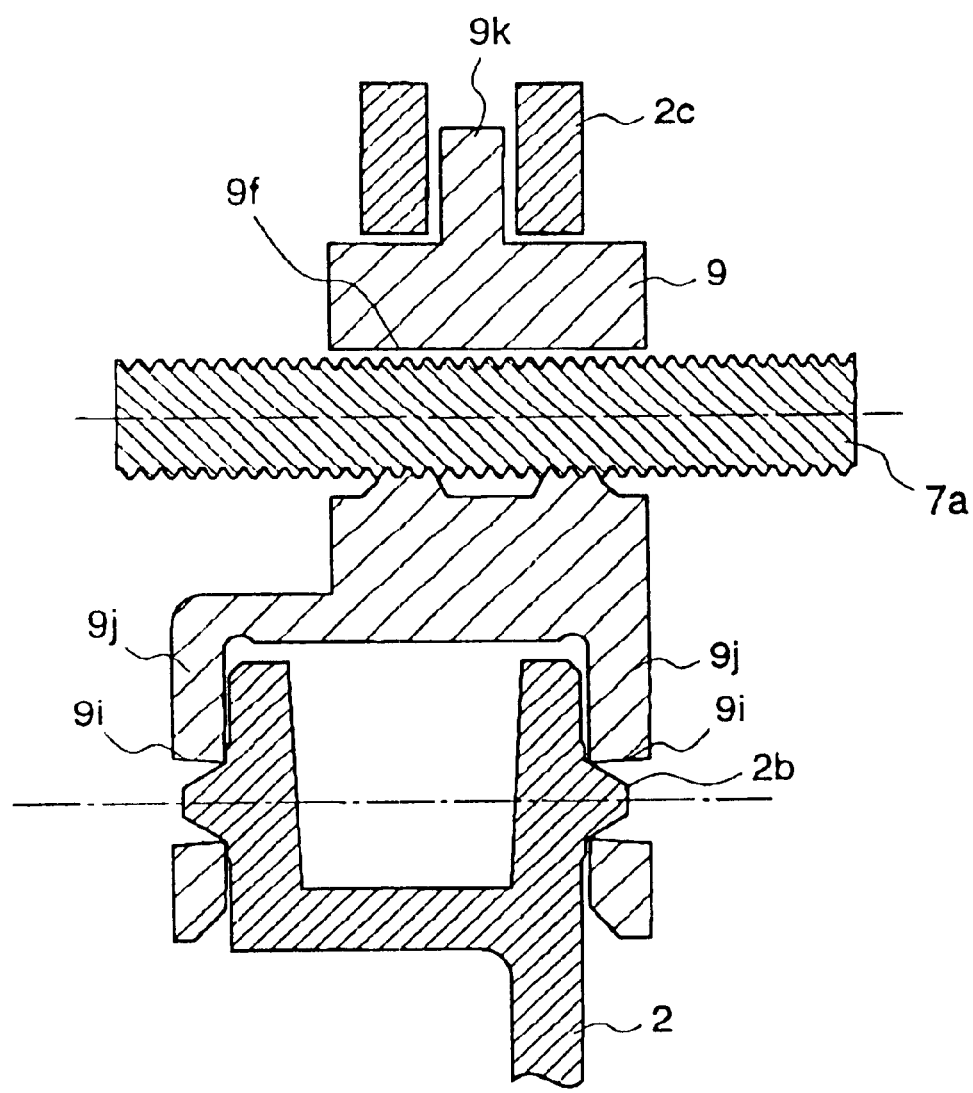
FIG. 5 is a cross sectional view of a main section illustrating a stopper of the driving member in the lens driving apparatus shown in FIG. 1.
Figure 6:
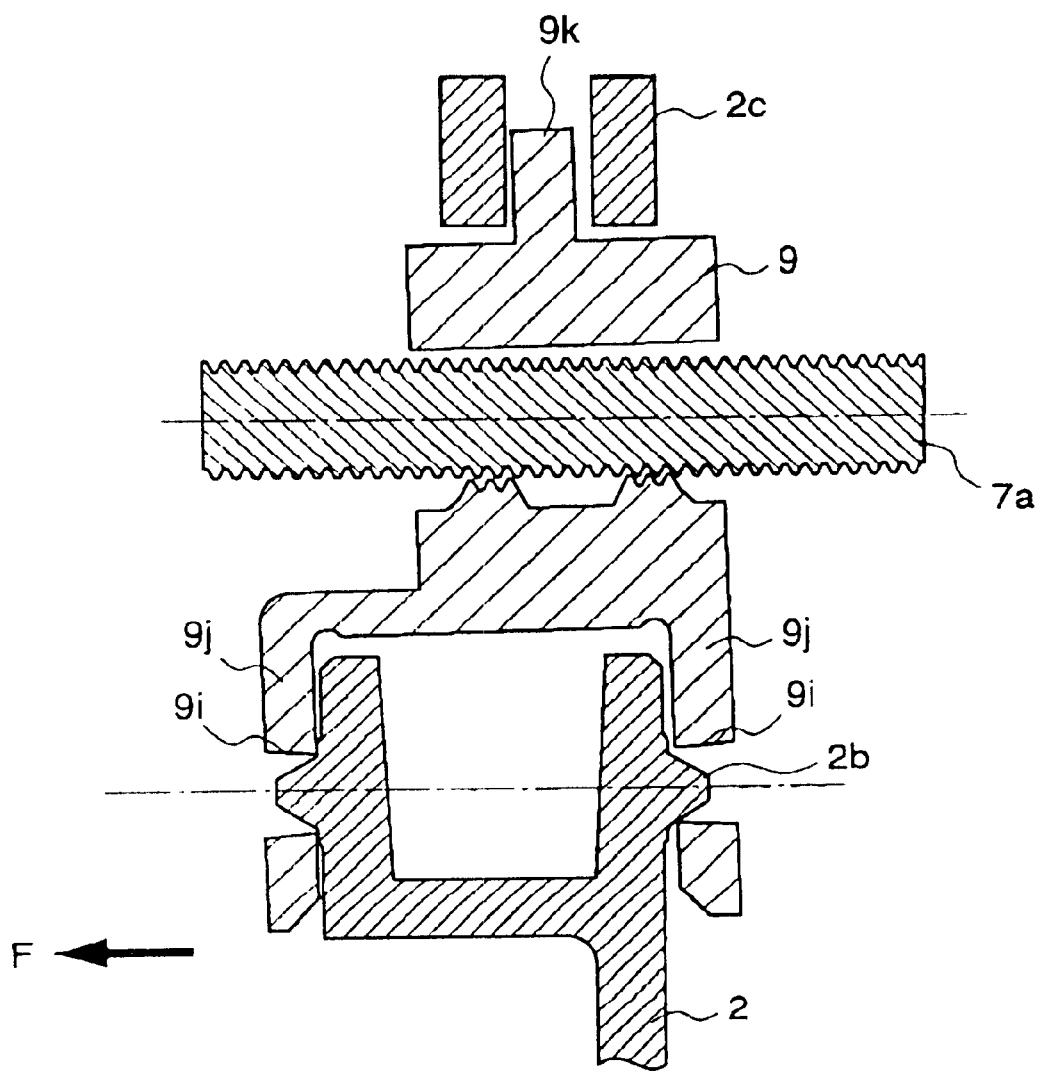
FIG. 6 is a cross sectional view of a main section illustrating a state where an external force acts on the lens holding frame to create displacement in the lens driving apparatus shown in FIG. 1.
Figure 7:
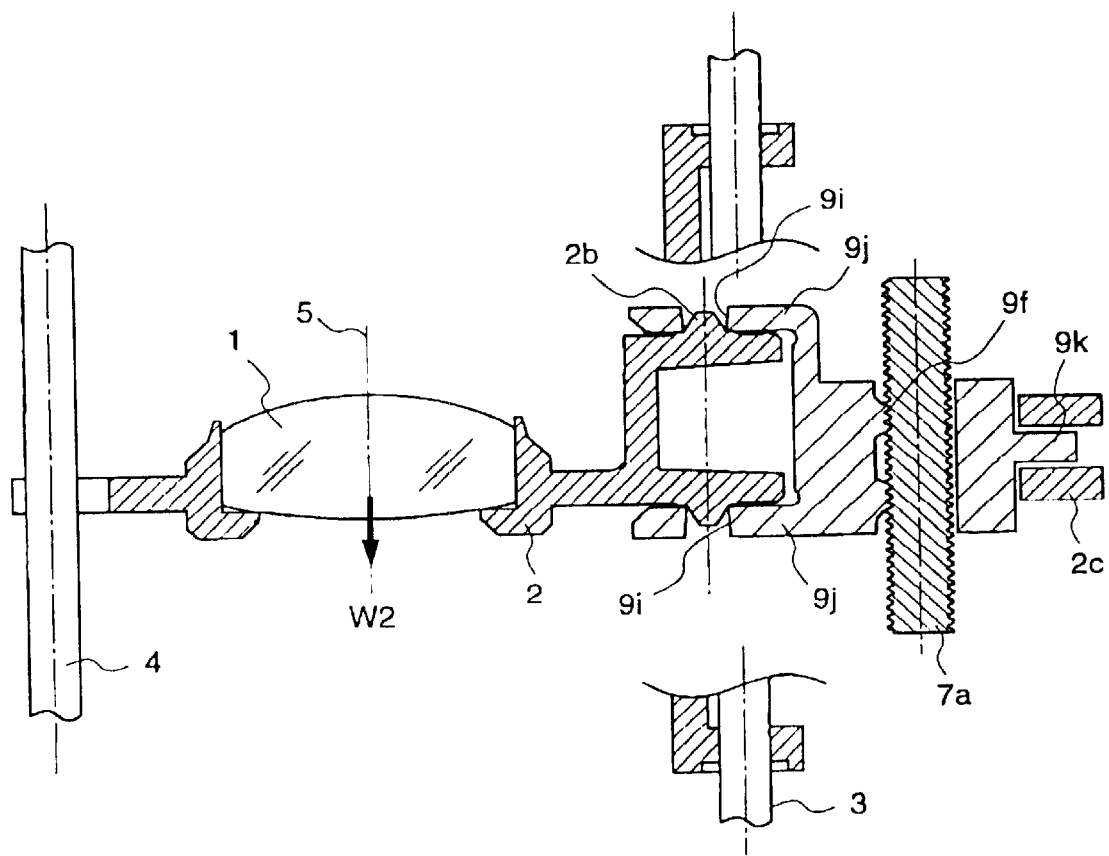
FIG. 7 is a cross sectional view of a main section illustrating a state where the lens driving apparatus shown in FIG. 1 is tilted upwardly.
Figure 8:
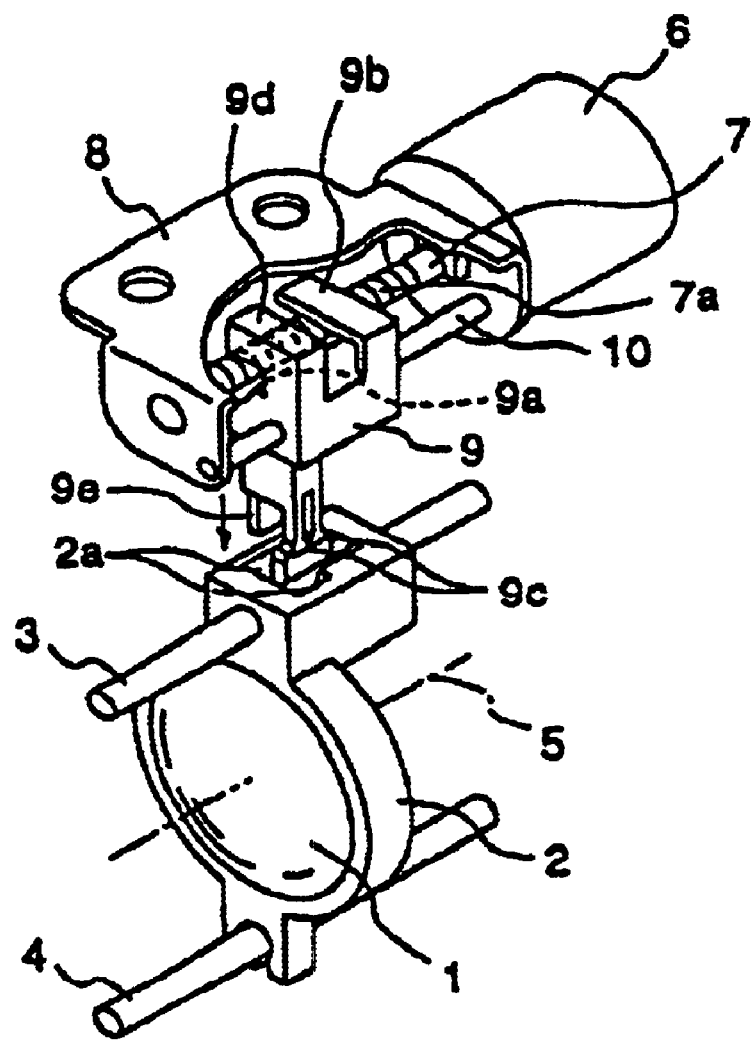
FIG. 8 is a perspective view of a main section in a conventional lens driving apparatus.
Figure 9:
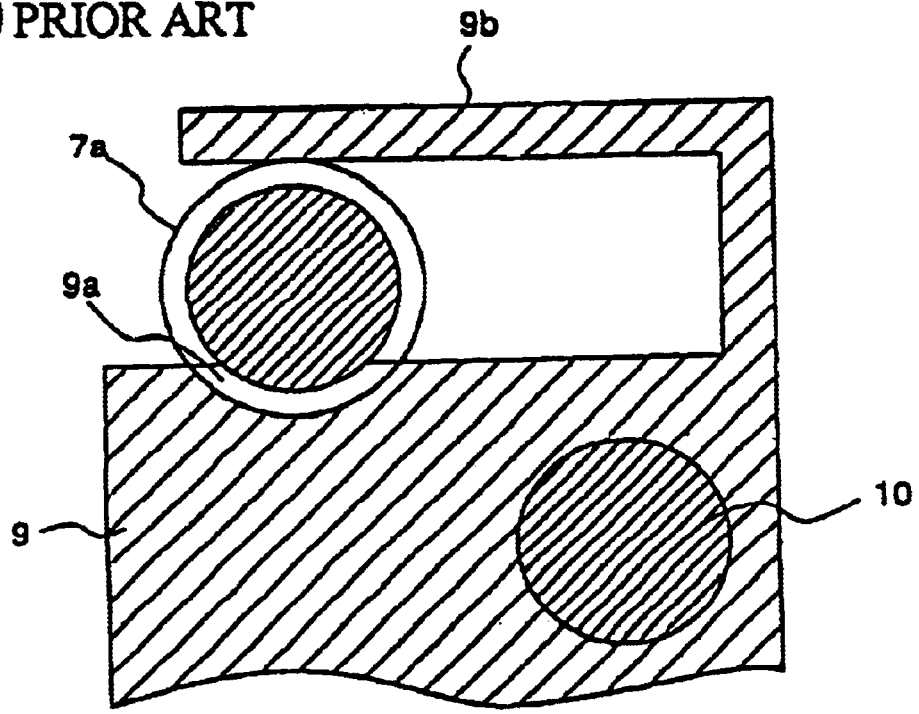
FIG. 9 is a partially cross sectional view illustrating an engagement of a first arm, having spring characteristics, of a driving member and a feed screw in the conventional lens driving apparatus.
Figure 10:
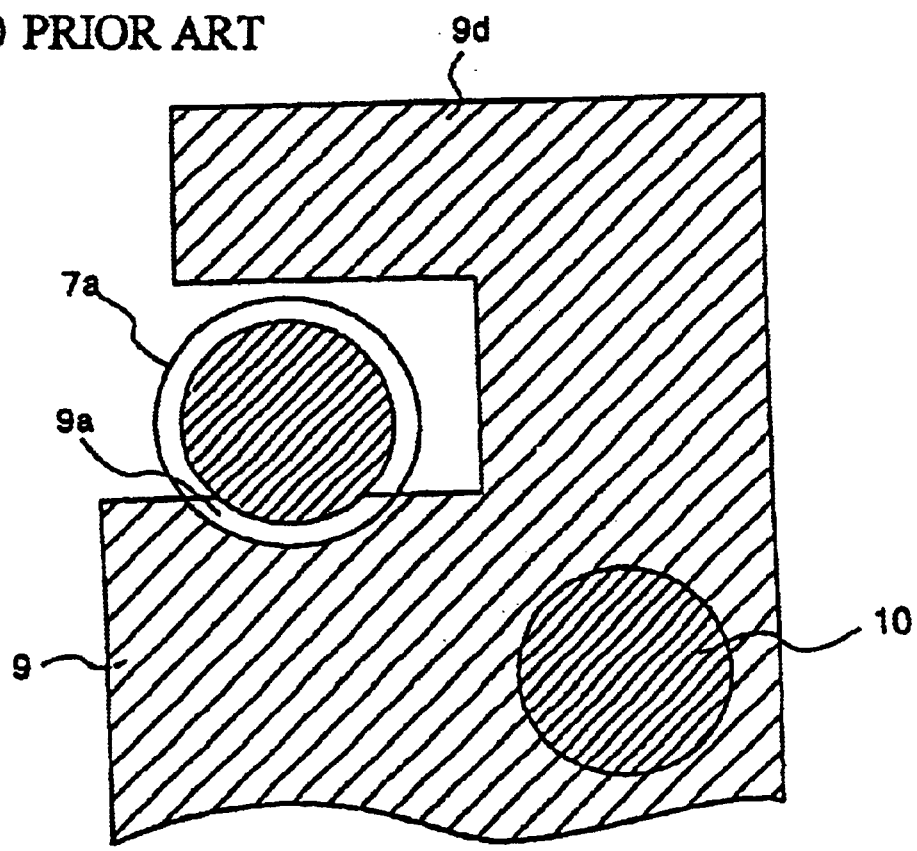
FIG. 10 is a partially cross sectional view illustrating an engagement of a second arm of the driving member and the feed screw in the conventional lens driving apparatus.
Figure 11:
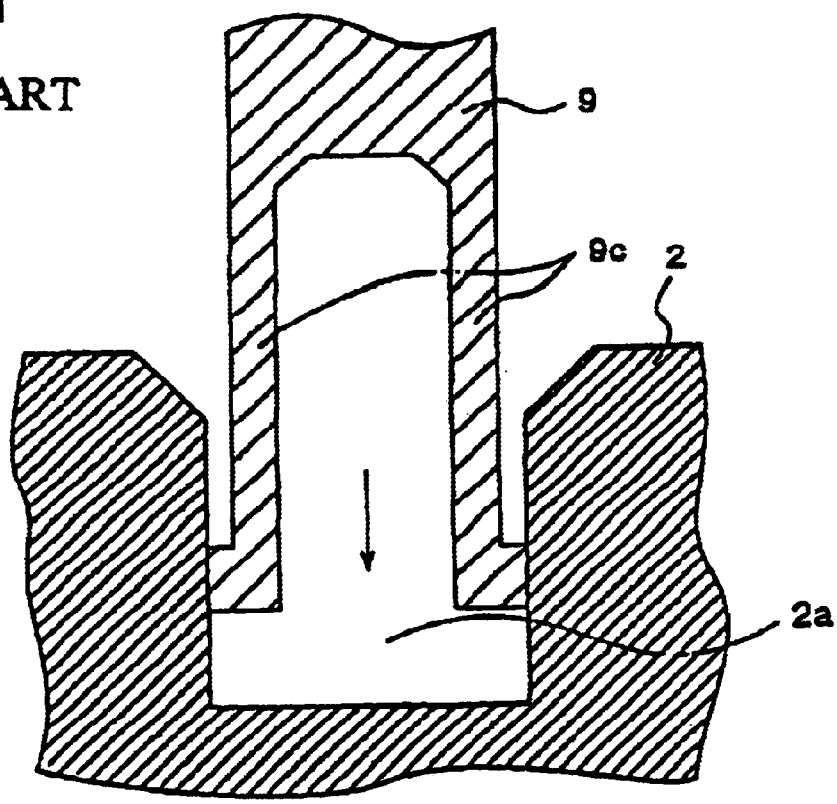
FIG. 11 is a partially cross sectional view illustrating a state where an edge portion, having spring characteristics, of the driving member and a lens holding frame engage with each other in the conventional lens driving apparatus.
Figure 12:
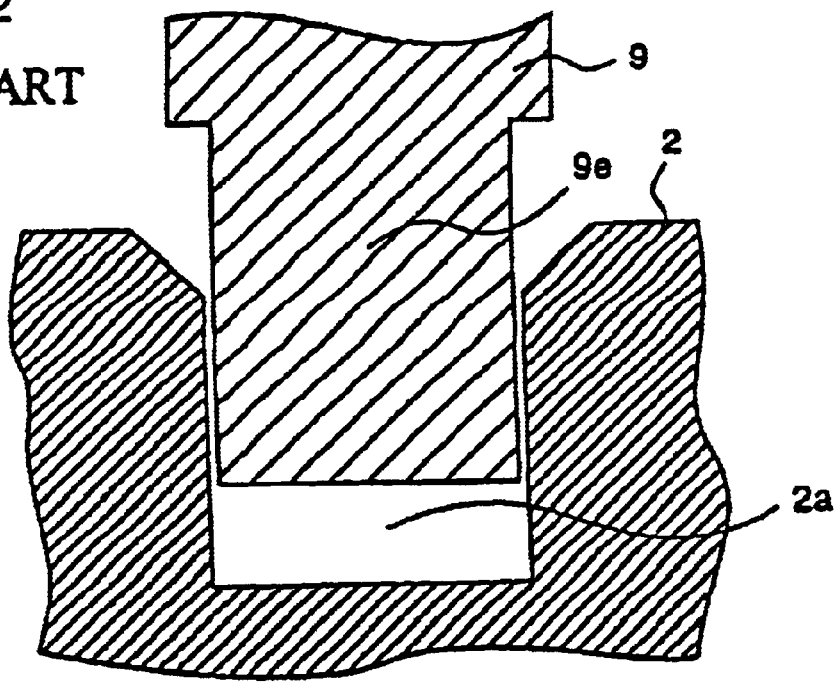
FIG. 12 is a partially cross sectional view illustrating a state where a stopper edge portion of the driving member is inserted into a groove for a joint of the lens holding frame in the conventional lens driving apparatus.
Figure 13:
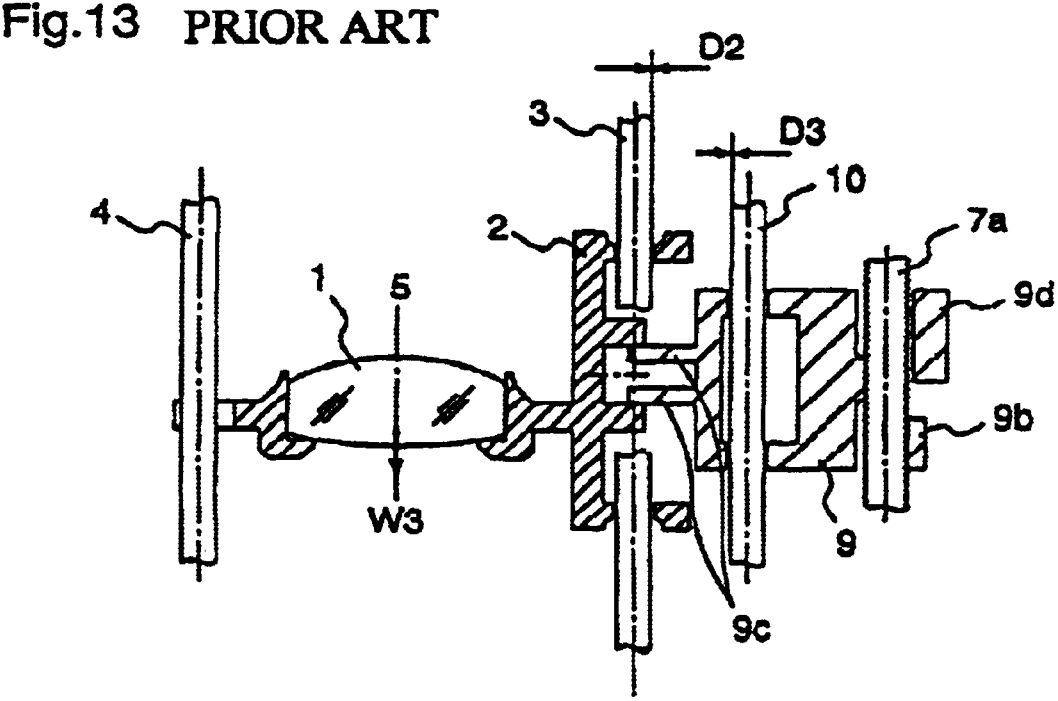
FIG. 13 is a cross sectional view of a main section when the conventional lens driving apparatus is directed in a horizontal direction to perform photographing.
Figure 14:
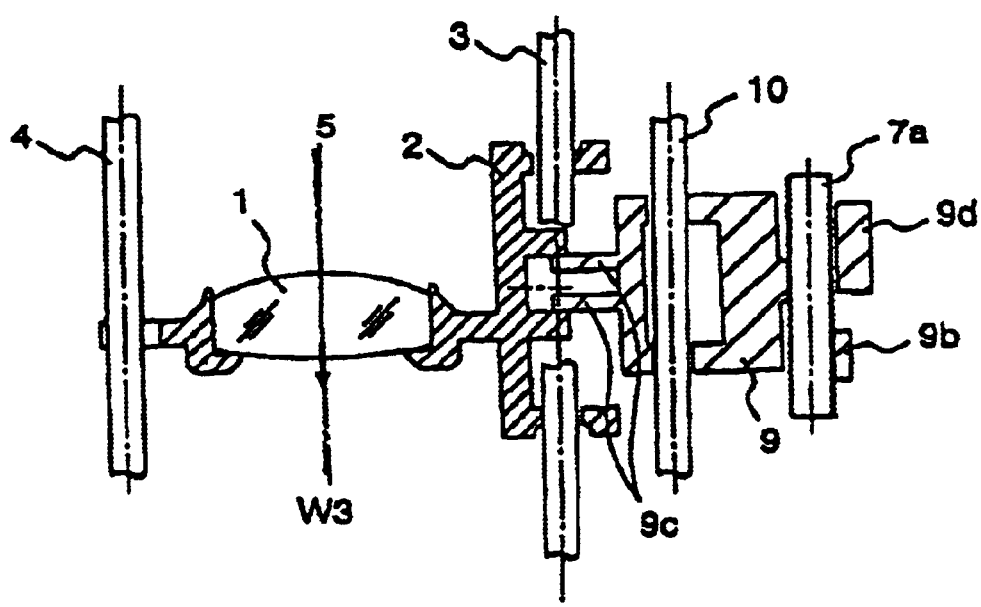
FIG. 14 is a cross sectional view of a main section illustrating a state where the conventional lens driving apparatus is tilted upwardly.

FIG. 1 is an exploded perspective view of a main portion of a lens driving apparatus according to an embodiment of the present invention. FIG. 2 is a side view illustrating a state where a driving member and a coil spring are attached to a lens holding frame in the lens driving apparatus shown in FIG. 1. FIG. 3 is a vector diagram illustrating directions of forces which act between a position where the lens holding frame and the coil spring are abutted, and a position where the lens holding frame and a second guide pole are abutted, in the lens driving apparatus shown in FIG. 1. FIG. 4 is a cross sectional view of a main section illustrating a state where a leg part of the driving member is attached to a positioning dowel of the lens holding frame in the lens driving apparatus shown in FIG. 1. FIG. 5 is a cross sectional view of a main section illustrating a stopper of the driving member in the lens driving apparatus shown in FIG. 1. FIG. 6 is a cross sectional view of a main section illustrating a state where an external force acts on the lens holding frame to create displacement in the lens driving apparatus shown in FIG. 1. And, FIG. 7 is a cross sectional view of a main section illustrating a state where the lens driving apparatus shown in FIG. 1 is tilted upwardly.

In FIGS. 1 and 2, numeral 1 denotes a lens, and numeral 2 denotes a lens holding frame made of a resin, for holding the lens 1. The lens holding frame 2 is held by a first guide pole 3 and a second guide pole 4, and has a constant clearance D1 with respect to the second guide pole 4 to be guided, and slidably moves in the direction of a lens optical axis 5. Numeral 9 denotes a driving member which connects the lens holding frame 2 with a feed screw 7a formed in a driving shaft 7 of a motor 6. On the driving member 9, the following components are integrally formed: a leg part 9j capable of elastic deformation, which part is composed of two plates having spring characteristics and extending parallel to each other; a mounting dowel 9h which mounts a coil spring 11; a first groove 9g against which an end portion of the coil spring 11 abuts; and a rack part 9f which is pressured and energized by the feed screw 7a and makes the driving member 9 itself move in the direction of the lens optical axis 5 together with a rotation of the feed screw 7a. Further, the leg part 9j is provided with a positioning hole 9i which engages with a positioning dowel 2b formed on the lens holding frame 2, and makes the leg part 9j and the lens holding frame 2 rotatable relative to each other.

Further, the coil spring 11 is engaged with the mounting dowel 9h, and a first end portion 11a and a second end portion 11b of the coil spring abut against the first groove 9g formed in the driving member 9 and second groove 2e formed in the lens holding frame 2, respectively. The rack part 9f abuts the feed screw 7a by a reaction force of the coil spring 11. Also, the lens holding frame 2 is constructed so as to rotate in a counterclockwise direction by using the first guide pole 3 as a rotation fulcrum shaft. Further, the lens holding frame 2 is provided with an engaging part 2c, as part of a stopper, integrally formed with the lens holding frame 2. The engaging part 2c is formed as two spaced-apart members extending from the lens holding frame 2.

In a lens driving apparatus so constructed, as shown in FIG. 2, a force always acts on a C-point of the lens holding frame 2, which has a constant clearance D1 with respect to the second guide pole 4, such that the lens holding frame is slidably and movably held in a counterclockwise direction shown by an arrow, by a reaction force of the coil spring 11. This will be described in detail with reference to the vector view shown in FIG. 3.

In FIG. 3, A shows a center of the first guide pole 3 shown in FIG. 2, B shows a contact point between the second groove 2e and the coil spring 11, and C shows a contact point between the second guide pole 4 and the lens holding frame 2.

When a vertical direction component of an elastic rotating force generated by the coil spring 11 relative to a line segment which links A to B is FB, a rotation moment is generated in the counterclockwise direction by taking the center A of the first guide pole 3 as a reference. Accordingly, when a component which acts in a vertical direction relative to a line segment which links the A-point to the C-point is FC, at the C-point a force in a direction of FC=FB 33 AB/AC always acts. Further, a moment, in a direction along which the lens holding frame 2 press-contacts with the second guide pole 4, created by a self-weight W1 of the lens holding frame 2, including the lens 1, is added to the elastic rotating force.

Next, as shown in FIG. 4, the positioning dowel 2b, having a taper-like projecting shape such that a the diameter of the dowel becomes smaller toward a tip thereof, which is formed integrally with the lens holding frame 2, is attached to the leg part 9j of the driving member 9 in a state such that the positioning dowel 2b is elastically supported by being sandwiched. Also, as shown in FIG. 2, the driving member 9 is rotated by the coil spring 11 in a clockwise direction, whereby the rack part 9f formed in the driving member 9 is threadedly engaged with the feed screw 7a. Further, the positioning hole 9i formed in the leg part 9j has a taper-like projecting shape such that a diameter of the hole becomes smaller toward a tip thereof, whereby the driving member 9 easily rotates. The positioning hole 9i is in linear contact with the positioning dowel 2b, i.e. is tangent with the positioning dowel, so as not to generate a backlash due to a clearance between the positioning hole 9i and the positioning dowel 2b of the lens holding frame 2, whereby rotating friction resistance is small. Further, as shown in FIG. 5, a projection 9k is provided at a tip of the driving member 9, and the members of the engaging part 2c are integrally formed on the lens holding frame 2 so as to define a space therebetween within which is received a tip of the projection 9k with a clearance. The engaging part 2c engages with the projection 9k so as to form the stopper.

In this way, the driving member 9 and the lens holding frame 2 engage with each other, whereby, as shown in FIG. 6, when a force in a direction shown by an arrow F acts on the lens holding frame 2 due to a fall, shock, or the like, lift is produced against the positioning dowel 9b in the leg part 9j. However, at this time, the projection 9k integrally formed at a tip of the driving member 9 abuts the engaging part 2c, so that the leg part 9j is not separated from the positioning dowel 2b.

In the lens driving apparatus so constructed, an operation thereof will be described hereinafter. When a video camera is trained on a given subject, a lens driving apparatus built in the video camera operates to perform focusing on the subject, and the lens 1 in this lens driving apparatus is moved to a focusing position by an automatic focusing control circuit (not shown). During this focusing operation, the lens driving apparatus shown in FIGS. 1 and 2 operates so that the motor 6 rotates, the driving member 9 pressed against the feed screw 7a by the coil spring 11 moves in the direction of the lens optical axis 5 in accordance with rotation of the motor 6, and the lens holding frame 2 connected to the driving member 9 is also guided by the first guide pole 3 and the second guide pole 4 in accordance with rotation of the motor 6 to slidably move in the direction of the lens optical axis 5, thereby obtaining focusing by using the lens 1.

At this time, although the feed screw 7a vibrates via rotational vibration of the motor 6, vibration of the feed screw 7a is transmitted to the driving member 9, because the rack part 9f of the driving member 9 is always pressed against the feed screw 7a. However, since the coil spring 11, which provides an elastic rotating force, is disposed between the driving member 9 and the lens holding frame 2, and further since a moment in a direction along which the lens holding frame 2 is pressed against the second guide pole 4 by the self-weight of the lens holding frame 2, including the lens 1, is added to the elastic rotating force, vibration which is produced in the lens holding frame 2 is absorbed.

Next, a description will be given of a case where the lens driving apparatus according to this embodiment is tilted upwardly with reference to FIG. 7. As shown in FIG. 7, the leg part 9j of the driving member 9 elastically supports the positioning dowel 2b having a taper-like projecting shape, by sandwiching the dowel 2b. In addition, the positioning hole 9i formed in the leg part 9j and having a taper-like projecting shape is in linear contact with the positioning dowel 2b so as not to generate a backlash due to a clearance between the positioning hole 9i and the positioning dowel 2b. Further, the driving member 9 is pressed against the feed screw 7a by the above-described action of the coil spring 11, and a moment in a direction along which the lens holding frame 2 press-contacts the second guide pole 4 is provided. Therefore, such a conventional phenomenon in that focusing is off because the lens 1 is tilted due to a difference between positions, is not realized. In addition, the driving member 9 can faithfully transmit feed displacement of the feed screw 7a to the lens holding frame 2 as feed displacement, and the lens 1 is guided by the first guide pole 3 and the second guide pole 4, thereby moving the lens 1 in the direction of the lens optical axis 5. Further, W2 denotes a self-weight in the direction of the lens optical axis 5.

Further, while an example in which the leg part 9j is integrally formed with the driving member 9 is described in this embodiment, this leg part 9j may be a different member that is separate from the driving member 9. Further, while the coil spring 11 is described as a different member from the driving member 9, the driving member 9 may be provided with a member having spring characteristics as an integrated part.

As described above, according to this embodiment, vibration of the motor 6 is absorbed by the coil spring 11 which is disposed between the driving member 9 and the lens holding frame 2, and by a pressing of the lens holding frame 2 against the second guide pole 4 due to self-weight of the lens holding frame 2, including the lens 1. Therefore, vibration of the lens 1 is not realized such that vibration of a photographed video is also not realized. Further, the positioning dowel 2b provided on the lens holding frame 2 is constructed so as to be elastically supported by being sandwiched in the positioning dowel 9i by the leg part 9j of the driving member 9, thereby eliminating an occurrence of backlash due to a clearance between the positioning dowel and positioning hole, faithfully transmitting feed displacement of the motor 6 at a time of photographing as feed displacement of the lens 1, and guaranteeing a continually stable driving performance of the lens 1.

INDUSTRIAL AVAILABILITY

As described above, the lens driving apparatus according to the present invention relates to a lens driving apparatus which performs focus adjustment (focusing) by performing lens position adjustment of a master lens when a subject is photographed by using a video camera or the like. The lens driving apparatus can prevent defocusing during a zooming operation resulting from manual focusing, or defocusing of a photographed image which would otherwise result from a difference between positions during photographing.

What is claimed is:

1. A lens driving apparatus comprising:
   a lens holding fame for holding a lens, said lens holding frame including a first tapered positioning dowel that tapers, along a first axis, from a larger diameter at a base end to a smaller diameter at a tip end;
   a first guide pole and a second guide pole for slidably supporting said lens holding frame so as to slidably support the lens in a direction of said first axis when the lens is held by said lens holding frame, wherein said first axis corresponds to an optical axis of the lens when the lens is held by said lens holding frame;
   a driving shaft having a feed screw;
   a motor to rotate said driving shaft and said feed screw;
   a driving member including a rack having one end that is threadably engaged with said feed screw and having a second end that is engaged with said lens holding frame, said driving member also including a first elastically deformable leg part, with said first elastically deformable leg part defining a first positioning hole with a diameter that is less than said larger diameter of said first postioning dowel, and with said first positioning dowel being received within said first positioning hole such that a portion of said first elastically deformable leg part that defines said first positioning hole is tangent with said first positioning dowel and such that said driving member is rotatably mounted to said lens holding same; and
   a spring member for urging said rack against said driving shaft, and for providing an elastic rotating force in a direction along which said lens holding frame presses against said second guide pole, said spring member being provided between said lens holding frame and said driving member, whereby a moment, in the direction along which said lens holding frame presses against said second guide pole, created by a self-weight of said lens holding frame is added to the elastic rotating force provided by said spring member.

2. The lens driving apparatus according to claim 1, wherein
   said lens holding frame also includes a second tapered positioning dowel that tapers, along said first axis, from a larger diameter at a base end to a smaller diameter at a tip end,
   said driving member also includes a second elastically deformable leg part that is parallel to said first elastically deformable leg part, said second elastically deformable leg part defining a second positioning hole with a diameter that is less than said larger diameter of said second positioning dowel, and with said second positioning dowel being received within said second positioning hole such that a portion of said second elastically deformable leg part that defines said second positioning hole is tangent with said second positioning dowel and such that said driving member remains rotatably mounted to said lens holding frame.

3. The lens driving apparatus according to claim 2, wherein said first and second elastically deformable leg parts are integral with said driving member.

4. The lens driving apparatus according to claim 3, wherein said first and second elastically deformable leg parts comprise resin material.

5. The lens driving apparatus according to claim 4, wherein said first and second elastically deformable leg parts define said first and second positioning holes in tip portions of said first and second elastically deformable leg parts, respectively.

6. The lens driving apparatus according to claim 5, further comprising a stopper for restricting deformation and removal of said driving member, said stopper being integral with said driving member and said lens holding frame and being in the vicinity of said feed screw.

7. The lens driving apparatus according to claim 1, wherein said first and second elastically deformable leg parts are integral with said driving member.

8. The lens driving apparatus according to claim 7, wherein said first and second elastically deformable leg parts comprise resin material.

9. The lens driving apparatus according to claim 8, wherein said first and second elastically deformable leg parts define said first and second positioning holes in tip portions of said first and second elastically deformable leg parts, respectively.

10. The lens driving apparatus according to claim 9, further comprising a stopper for restricting deformation and removal of said driving member, said stopper being integral with said driving member and said lens holding fame and being in the vicinity of said feed screw.

11. The lens driving apparatus according to claim 1, wherein said first and second elastically deformable leg parts comprise resin material.

12. The lens driving apparatus according to claim 11, wherein said first and second elastically deformable leg parts define said first and second positioning holes in tip portions, of aid first and second elastically deformable leg parts, respectively.

13. The lens driving apparatus according to claim 12, further comprising a stopper for restricting deformation and removal of said driving member, said stopper being integral with said driving member and said lens holding frame and being in the vicinity of said feed screw.

14. The lens driving apparatus according to claim 1, wherein said first and second elastically deformable leg parts define said first and second positioning holes in tip portions said first and second elastically deformable leg parts, respectively.

15. The lens driving apparatus according to claim 14, further comprising a stopper for restricting deformation and removal of said driving member, said stopper being integral with said driving member and said lens holding frame and being in the vicinity of said feed screw.

16. The lens driving apparatus according to claim 1, further comprising a stopper for restricting deformation and removal of said driving member, said stopper being integral with said driving member and said lens holding frame and being in the vicinity of said feed screw.

17. The lens driving apparatus according to claim 16, wherein said stopper includes a projection extending from said driving member and an engaging part to receive said projection.

18. The lens driving apparatus according to claim 17, wherein said engaging part comprises a first member and a second member defining a space therebetween and extending from said lens holding frame, and said engaging part is to receive said projection by receiving said projection within said space such that said projection is linearly displaceable within said space from said first member to said second member.

* * * * *

UNITED STATES PATENT AND TRADEMARK OFFICE
CERTIFICATE OF CORRECTION

PATENT NO. : 6,654,557 B2
DATED : November 25, 2003
INVENTOR(S) : Yoshihiro Kikuchi et al.

It is certified that error appears in the above-identified patent and that said Letters Patent is hereby corrected as shown below:

Column 8,
Lines 55, 58, 61 and 63, delete "and second" after "first".
Lines 55, 58, 61 and 63, change "parts" to -- part --.
Line 56, change "are" to -- is --.
Line 59, change "comprise" to -- comprises --.
Line 62, change "define" to -- defines --.
Line 62, change "holes" to -- hole --.
Line 62, insert -- a -- after "in".
Line 62, change "portions," to -- portion --.
Line 64, delete "respectively".

Column 9,
Lines 4, 7, 8, 9, 17, 18 and 19, delete "and second" after "first".
Lines 4, 7 and 17, change "parts" to -- part --.
Line 5, change "comprise" to -- comprises --.
Lines 8 and 18, change "define" to -- defines --.
Line 8, change "holes" to -- hole --.
Lines 8 and 18, insert -- a -- after "in".
Line 9, change "portions," to -- portion --.
Line 9, change "parts," to -- part --.
Line 10, delete "respectively".
Lines 19-20, change "parts, respectively." to -- part. --.

Signed and Sealed this

Thirteenth Day of July, 2004

JON W. DUDAS
*Acting Director of the United States Patent and Trademark Office*